United States Patent [19]

Obst

[11] Patent Number: 4,765,711

[45] Date of Patent: Aug. 23, 1988

[54] UNDERWATER FIBER OPTIC CABLE WEIGHTED WITH METAL PARTICLES

[75] Inventor: Donald L. Obst, Hickory, N.C.

[73] Assignee: Siecor Corporation, Hickory, N.C.

[21] Appl. No.: 532,680

[22] Filed: Sep. 16, 1983

[51] Int. Cl.[4] .......................... G02B 6/44; H02G 3/00; F16L 1/00

[52] U.S. Cl. ................................ 350/96.23; 174/70 R; 405/154; 405/158

[58] Field of Search ........................ 350/96.10, 96.23; 138/103, 118, 129, 132, 133, 172, 174; 405/154, 158, 171, 172, 195, 203, 205; 174/68 R, 70 R, 70 S, DIG. 2

[56] References Cited

U.S. PATENT DOCUMENTS

| | | | |
|---|---|---|---|
| 2,035,088 | 3/1936 | McNamee | 174/70 R |
| 3,166,688 | 1/1965 | Rowland et al. | 138/103 |
| 3,813,477 | 5/1974 | Fischer | 174/70 R |
| 4,176,240 | 11/1979 | Sabia | 174/23 C |
| 4,312,383 | 1/1982 | Kleykamp | 138/103 |
| 4,324,453 | 4/1982 | Patel | 350/96.23 |

FOREIGN PATENT DOCUMENTS 2924495  1/1981  Fed. Rep. of Germany ... 350/96.23

OTHER PUBLICATIONS

Siecor, "Siecor General Purpose Optical Cables", Siecor Inc. Publication (612/622 and 012/022), 6/79.

Primary Examiner—William L. Sikes
Assistant Examiner—Brian M. Healy
Attorney, Agent, or Firm—Roy B. Moffitt

[57] ABSTRACT

A fiber optic cable adapted for underwater duty comprising a core of optical fibers circumferentially surrounded by jacket, the jacket being composed of metal particles suspended or embedded in a plastic.

9 Claims, 2 Drawing Sheets

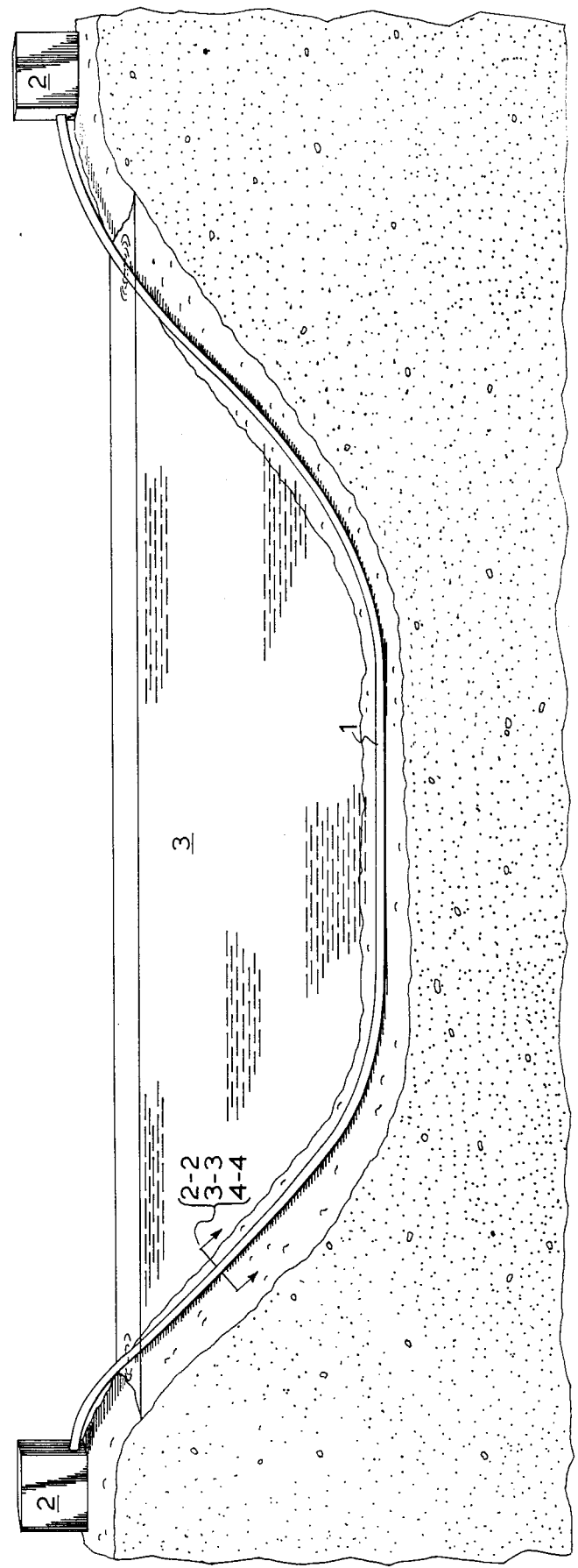

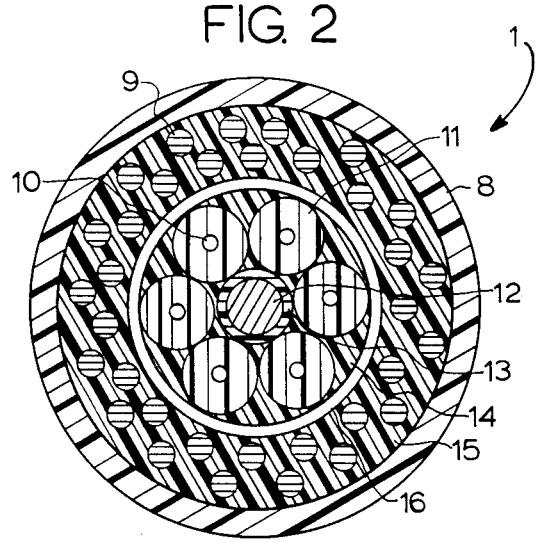
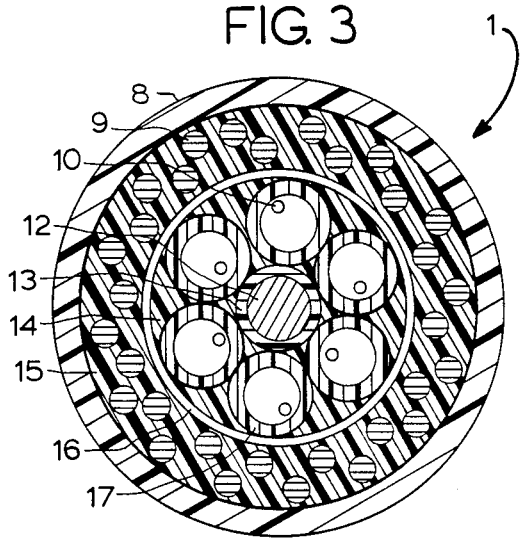
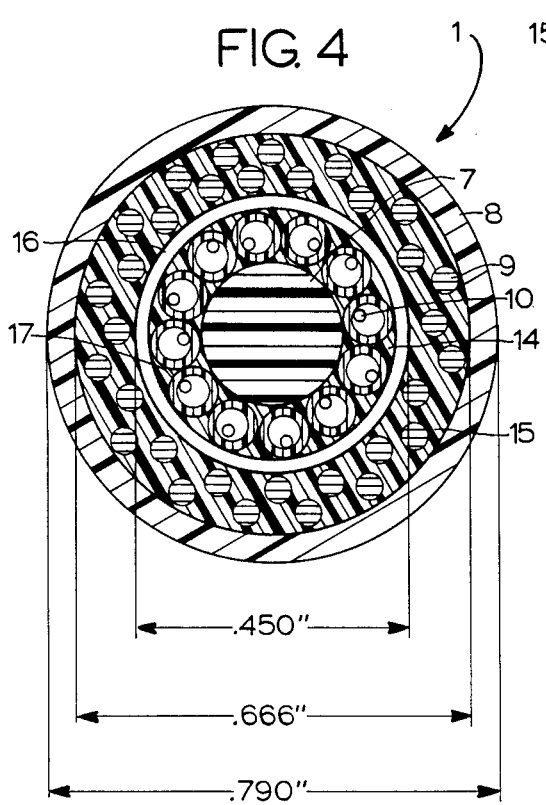
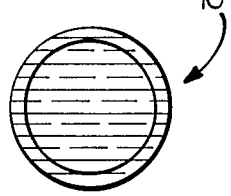

UNDERWATER FIBER OPTIC CABLE WEIGHTED WITH METAL PARTICLES

BACKGROUND OF THE INVENTION

Compared to their metallic cousins, fiber optic cables are light in weight. For example, a cable comprised of twisted pairs of insulated copper conductors capable of carrying a given traffic load weights many times that of a fiber optic cable having the same traffic capacity. In some instances, fiber optic cables designed for underwater duty are so light in weight that they would actually float on water absent an added weight, i.e., a heavy and expensive messenger. Such cable construction is expensive and unnecessary and it is to the solution of this prior art problem that the present invention is addressed.

BRIEF DESCRIPTION OF THE INVENTION

The fiber optic cable of the present invention comprises a core of optical fibers. Usually, the interstitial spaces between the fibers making up the core are filled with a cable filling material, such as petrolatum or block copolymer materials. See for example, cable filling materials as disclosed in U.S. Pats. Nos. 4,176,240 and 4,324,453. Circumferentially surrounding the core is a jacket of plastic material in which there is suspended or embedded metal particles such as steel or lead shot. Depending on the water density encountered (fresh or saline) the amount and density of metal particles used, a cable can be designed so that it will readily sink to the bottom of any given body of water. In most cases, another overlying plastic jacket circumferentially surrounds the plastic material containing metal particles, such jacket being composed of any convenient plastic such as polyethylene, polypropylene, rubber, polyamide, polyurethane, polyvinyl chloride and mixtures thereof.

BRIEF DESCRIPTION OF THE DRAWINGS

FIG. 1 is a cross section of a body of water showing the underwater cable of the invention in its intended environment.

FIGS. 2, 3 and 4 are cross sections of the cable of FIG. 1 along lines 2—2; 3—3 and 4—4 respectively.

FIG. 5 is a cross section of optical fiber 10 of FIGS. 2, 3 and 4.

DETAILED DESCRIPTION OF THE INVENTION

Shown in FIG. 1 is the underwater flow optic cable 1 of the instant invention in its intended environment. Underwater fiber optic cable 1 is disposed in a body of water 3 and connected to terminals 2, which are on dry land. Cable 1 is constructed so that when it is placed in water 3, it sinks to the bottom because of its own mass, the specific structure of such is described as follows.

Different embodiments of cable 1 are shown in FIGS. 2, 3 and 4, like numbers representing like elements. Referring first to FIG. 2, cable 1 is shown having jacket 8, which can be made from either a polyamide, a polyolefin, polyvinyl chloride, rubber, polyurethane or mixtures thereof. The core of cable 1 is made up of a steel or iron strength member 12 (surrounded by a suitable plastic 13) circumscribed by a plurality of tight buffered optical fibers 10 having a coat of plastic material 11 circumscribing the fibers. In between the tight buffered fibers (elements 10 and 11) may be disposed plastic filling material 14 such as a block copolymer or petrolatum. In between the core [filling material 14, tight buffered fibers elements 10 and 11 and the center strength member elements 12 and 13] and the outer jacket 8, there is disposed metal particles 9 suspended in a plastic 15. Metal particles 9 can be ferrous or nonferrous (iron or lead shot) of any desirable particle size and shape; however, preferably they are between 0.020 and 0.40 in diameter and in amount so that they occupy 25% to 75% of the volume. A specific example of shot size is shot that will pass a screen having openings of a maximum of 0.0394 inches. The balance of the volume is occupied by plastic 15, which may be of the same materials as listed for jacket 8. If desired, a core wrap 16, made of either polyethylene or polyethylene teraphthalate may be used to delimit the core.

The cable structure of FIG. 3 has basically the same structure as shown in FIG. 2, except that the optical fibers are in a "loose tube" structure rather than a tight buffered configuration. Again, as it was in FIG. 2, there is a center support member 12 surrounded by a dielectric plastic means 13 and around the periphery of the center support member there are a plurality of plastic tubes 17 in which optical fibers 10 are loosely disposed. Core wrap member 16 delimits the core and in the volume delimited by element 16, not otherwise occupied by tubes 17, is plastic filling material 14. Jacket 8 circumscribes the core and is spaced apart therefrom creating a volume in which there is disposed metal particles 9 suspended in a plastic 15, as was the case described in FIG. 2.

Element 1 of FIG. 4 has a structure that is basically the same as that shown in FIG. 3, except that the central strength member 7 is made entirely of a plastic, e.g., an aramid or graphite. Specific dimensions are given in FIG. 4 for the purpose of disclosing a specific example that will sink when it is put in a body of water. In the embodiment of FIG. 4, shot 9 and plastic 15 (steel and polyvinyl chloride respectively) have a composite density of 190 pounds per cubic foot. The shot by volume is 25% and by weight 50%. Assuming either a saline or a fresh body of water 3, a cable of the design of FIG. 4 will sink to the bottom of water 3 (assuming a fifty foot depth) and stay there. Optical fibers 10 are spliced into other optical fibers (not shown) to complete a transmission link.

Although the invention has been described in considerable detail, such detailed description is only for the purpose of illustrating specific embodiments. It is evident that variations and modifications can be made from those described without departing from the spirit and scope of the invention.

What is claimed is:

1. A fiber optic cable comprising:
   (a) a core comprising a strength member and a plurality of optical fibers;
   (b) a jacket circumscribing and spaced apart from said core defining a volume; and,
   (c) said volume occupied by a mixture of metal particles and plastic.

2. The fiber optic cable of claim 1 wherein said jacket is composed of a material selected from the group consisting essentially of rubber, polyamide, polyurethane, polyvinyl chloride, polyolefin, and mixtures thereof.

3. The fiber optic cable of claim 1 wherein said metal particles are either ferrous or nonferrous metals or mixtures thereof and at least some of which are spherical in shape.

4. The fiber optic cable of claim 1 wherein said metal particles are steel and have a particle size between 0.02 and 0.04 inches.

5. The fiber optic cable of claim 1 wherein the metal particles occupy 25% to 75% of the volume.

6. The fiber optic cable of claim 1 wherein the plastic occupying volume is between 25% and 75% of the volume.

7. The fiber optic cable of claim 1 wherein the plastic occupying the volume is selected from the group consisting essentially of rubber, polyolefin, polyvinyl chloride, polyamide, polyurethane, and mixtures thereof.

8. The fiber optic cable of claim 1 wherein the particle size of said metal particles is such that it will pass a screen having screen openings of 0.0394 inches.

9. The fiber optic cable of claim 1 wherein said strength member is made from materials selected from the group comprising steel, iron, polyamide, aramide and graphite.

* * * * *